United States Patent
Zavarehi et al.

(10) Patent No.: US 6,234,010 B1
(45) Date of Patent: May 22, 2001

(54) METHOD AND SYSTEM FOR PREDICTING TORQUE FROM CRANK SPEED FLUCTUATIONS IN AN INTERNAL COMBUSTION ENGINE

(75) Inventors: Masoud K. Zavarehi, Peoria; David R. Schricker, Dunlap, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/282,333

(22) Filed: Mar. 31, 1999

(51) Int. Cl.$^7$ .................................................... G01M 15/00
(52) U.S. Cl. ........................................................ 73/117.3
(58) Field of Search ................................. 73/116, 117.2, 73/117.3, 862.08, 862.09; 340/441; 701/110

(56) References Cited

U.S. PATENT DOCUMENTS

| | | | |
|---|---|---|---|
| 4,697,561 | 10/1987 | Citron | 123/339 |
| 5,109,695 | 5/1992 | James et al. | 73/117.3 |
| 5,176,118 | 1/1993 | Norota | 123/435 |
| 5,200,899 | 4/1993 | Ribbens et al. | 364/431.08 |
| 5,239,473 | 8/1993 | Ribbens et al. | 364/431.08 |
| 5,245,542 | 9/1993 | Itoh et al. | 364/426.02 |
| 5,278,760 | 1/1994 | Ribbens et al. | 364/424.1 |
| 5,365,780 | 11/1994 | Feldkamp | 73/117.3 |
| 5,878,366 | 3/1999 | Schricker et al. | |

Primary Examiner—Eric S. McCall
(74) Attorney, Agent, or Firm—Kevin M. Kercher; Steven G. Kibby

(57) ABSTRACT

A method and system for detecting torque of a reciprocating internal combustion engine, the internal combustion engine having at least one cylinder and a rotatable crankshaft. This method and system includes sensing rotational crankshaft speed for a multiple of designated crankshaft rotational positions over a predetermined number of cycles of rotation for each crankshaft position and determining an average crankshaft speed fluctuation for each crankshaft position and determining information representative of crankshaft kinetic energy variations due to each firing event and each compression event in the cylinder and then determining information representative of crankshaft torque as a function of the crankshaft kinetic energy variations and the average crankshaft speed and responsively producing a representative crankshaft torque signal.

18 Claims, 2 Drawing Sheets

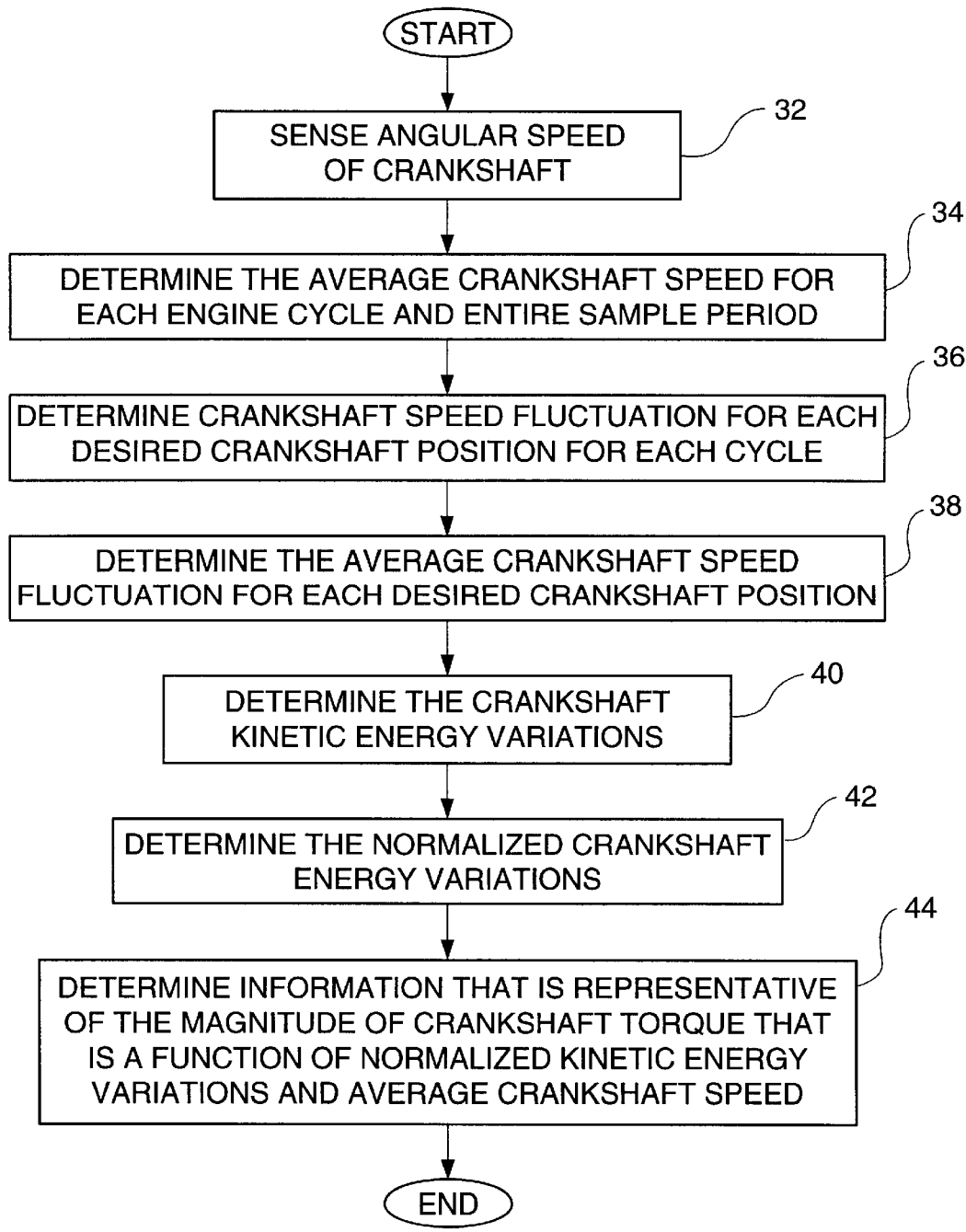

METHOD AND SYSTEM FOR PREDICTING TORQUE FROM CRANK SPEED FLUCTUATIONS IN AN INTERNAL COMBUSTION ENGINE

This application claims priority from application Ser. No. 09/216,597, filed Dec. 18, 1998 and now U.S. Pat. No. 6,082,187.

TECHNICAL FIELD

This invention relates generally to a reciprocating internal combustion engine, and more particularly, to a method and system for predicting torque from crank speed fluctuations in an internal combustion engine.

BACKGROUND ART

Knowing the torque that an engine delivers when running is important for both a determination of engine starting power and total power loss for an engine. Power loss conditions in internal combustion engines present several problems, including increased down time and excess exhaust emissions. Excess exhaust emissions are extremely problematic since government regulations are making more stringent demands or limits on the exhaust emissions of internal combustion engines (diesel or spark ignited). Power loss can be caused by complete and/or partial misfires or clogged fuel injectors. Typically, on-line, crankshaft torque measurements require expensive measuring devices such as dynamometers.

The present invention is directed to overcoming one or more of the problems set forth above.

DISCLOSURE OF THE INVENTION

In one aspect of the present invention, a method for detecting torque of a reciprocating internal combustion engine is disclosed. The engine has a plurality of reciprocating components including, but not limited to, at least one cylinder and a rotatable crankshaft. The method includes the steps of sensing rotational crankshaft speed for a plurality of designated crankshaft rotational positions over a predetermined number of cycles of rotation for each crankshaft position and determining an average crankshaft speed fluctuation for each crankshaft position and determining information representative of crankshaft kinetic energy variations due to each firing event and each compression event in the cylinder and then determining information representative of crankshaft torque as a function of the crankshaft kinetic energy variations and the average crankshaft speed and responsively producing a representative crankshaft torque signal.

In another aspect of the present invention, a system for detecting torque of a reciprocating internal combustion engine is disclosed. The engine has a plurality of reciprocating components including, but not limited to, at least one cylinder and a rotatable crankshaft. The system includes an input mechanism that generates a signal, including a value for rotational crankshaft speed for a plurality of designated crankshaft rotational positions over a predetermined number of cycles of rotation for each crankshaft position and an electronic controller for determining an average crankshaft speed fluctuation for each crankshaft position and determining information representative of crankshaft kinetic energy variations due to each firing event and each compression event in the cylinder and then determining information representative of crankshaft torque as a function of the crankshaft kinetic energy variations and the average crankshaft speed and responsively producing a representative crankshaft torque signal.

BRIEF DESCRIPTION OF THE DRAWINGS

For a better understanding of the present invention, reference may be made to the accompanying drawings in which:

FIG. 2 is a flowchart illustrating software for detecting crankshaft torque of an internal combustion engine according to the present invention.

BEST MODE FOR CARRYING OUT THE INVENTION

Figure 1:
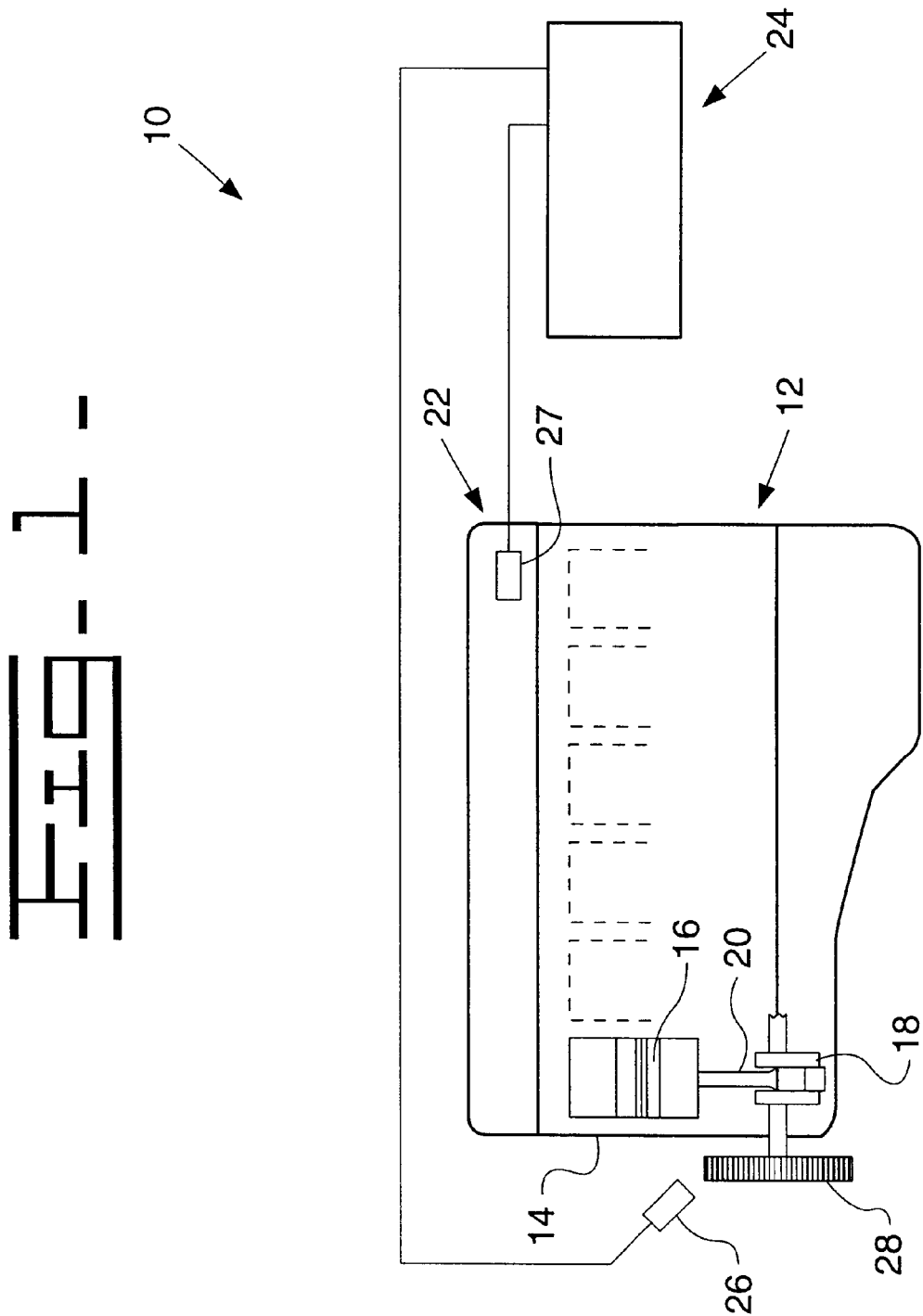
FIG. 1 is a diagrammatic illustration of an apparatus for predicting engine torque from crank speed fluctuations in an internal combustion engine according to the present invention.

Referring now to the drawings, and initially to FIG. 1, an electronic control system 10 is depicted for predicting torque of an internal combustion engine 12. Determination of torque can provide both an actual power level and the presence of a power loss condition in a cylinder 14 of an internal combustion engine 12. The power loss condition typically indicates degradation of an individual cylinder 14. This can be due to a complete or partial misfire, clogged fuel injector, or some other problem. Preferably, the internal combustion engine 12 can be a six cylinder, compression ignited, diesel engine. However, any of a wide variety of both spark ignited and compression-ignited engines, having one or more cylinders, can be utilized with the present invention. Each of the cylinders, as represented by numeral 14, has a piston 16 reciprocally moveable therein. Each piston 16 is connected to a rotatable crankshaft 18 by a connecting rod 20 for rotating the crankshaft 18. Fuel delivery from a fuel source (not shown) to the individual cylinders of the internal combustion engine 12 can be controlled by a governor 22 in a typical, conventional manner. The governor 22 is operable for controlling fuel delivery to the cylinder(s) 14 of the internal combustion engine 12, and includes a fuel quantity sensor 27 for sensing the amount of fuel requested by the governor 22, which is defined as the fuel flow rate and communicating a fuel quantity signal representative thereof to an electronic control module 24. Preferably, this fuel flow rate can be a derived value that correlates or even equals the rack value instead of utilizing a sensor.

The operation of the internal combustion engine 12 is controlled by an electronic control module 24, which can also be referenced as an electronic controller. The electronic control module 24 can include, but is not limited to, a processor such as a microprocessor, however, any of a wide variety of computing devices will suffice. The electronic control module 24 preferably includes, but is not limited to, a memory device and a clock, and is representative of both floating point processors, and fixed point processors. The electronic control module 24 is operable for receiving information from a variety of sensors and other devices associated with the internal combustion engine 12. This can include, but is not limited to, an engine speed sensor 26 and a fuel quantity sensor 27, both electrically connected to the electronic control module 24. The engine speed sensor 26 is an input mechanism that generates a signal and can be any suitable commercially available device, such as a magnetic speed pick-up that changes its output voltage whenever predetermined indicia is in proximity thereto. A nonlimiting example of such indicia could include angularly spaced teeth 28 on a crank gear of the rotatable crankshaft 18. A typical, but nonlimiting, example of a magnetic speed pick-up would be a conventional electrical transducer. However, numerous other types and methods of speed sensing may be utilized.

Due to the fact that the angular distance between successive indicia, that is, two successive angularly spaced teeth 28, will be known, the speed of the rotatable crankshaft 18 can be determined using the data generated by the engine speed sensor 26. The electronic control module 24 is operable to convert the sensor data, which is a raw voltage, into revolutions per minute (rpm). The engine speed sensor 26 is thus operable for sensing the angular speed of the rotatable crankshaft 18 for a discrete plurality of angular crankshaft positions and responsively producing a crankshaft speed signal that is received by the electronic control module 24. Preferably, the angularly spaced teeth 28 on the crank gear of the rotatable crankshaft 18 are located at ten degree (10°) increments around the gear circumference thereof corresponding to ten degree (10°) increments around the rotatable crankshaft 18. There is a top dead center position for the cylinder 14 that is represented by a missing tooth to provide a reference point. It should be recognized and understood that the angular positions around rotatable crankshaft 18 of the top dead center positions for the remaining five cylinders of the internal combustion engine 12 are also known.

The software for predicting torque of an internal combustion engine 12 will now be discussed with reference to FIG. 2, which depicts a flowchart representative of the computer program instructions executed by the electronic control module 24, as shown in FIG. 1. A programmer skilled in the art could utilize this flowchart to program any of a wide variety of electronic controllers/computers in a wide variety of programming languages. In the description of the flowcharts, the functional explanation marked with numerals in angle brackets, <nnn>, will refer to the flowchart blocks bearing that number.

As shown in FIG. 2, the software program initially determines the angular velocity or speed of crankshaft 18 as the crankshaft 18 is being rotated <32>. As previously stated, the angularly spaced teeth 28 that are located around the circumference of the crank gear of the rotatable crankshaft 18 provide positional information enabling the angular velocity of the crankshaft 18 at any predetermined position of the crankshaft 18 (preferably ten degrees (10°)) to be sensed over a desired predetermined number of cycles of rotation of the rotatable crankshaft 18, hereinafter defined as the sample period.

The next step in the software program determines the average crankshaft speeds for each engine cycle and for the entire sample period <34>. The third step in the software program is to determine the average crankshaft speed fluctuation for a desired number of crankshaft positions <36>. This is accomplished by subtracting the crankshaft cycle average speed calculated in program step <34> with each crankshaft speed measurement. This will ameliorate the effects of noise and external load disturbance other than the malfunctions that are the object of a detection process. These problems can include, but are not limited to, problems relating to the fuel injector and the like discussed above. This program step also increases the resolution for differentiating between malfunctions and minor cylinder power losses. It should be noted that each cycle of the internal combustion engine 12 comprises two revolutions of the rotatable crankshaft 18 Seven Hundred and Twenty Degrees (720°). This includes a firing event near the top dead center of one of the revolutions. The electronic control module 24 is able to determine the top dead center position using cam gear positional data or the like. The speed data is then preferably arranged into Seven Hundred and Twenty Degree (720°) engine cycle segments measured from a selected top dead center for the cylinder 14. Each speed segment will preferably, but not necessarily, consist of 72 data points corresponding to ten degree (10°) increments for two rotatable crankshaft revolutions per cycle equating to thirty-six (36) angularly spaced teeth 28 around the circumference of the crank gear, including the missing tooth for the top dead center for the cylinder 14 in each revolution of the rotatable crankshaft 18. The average crankshaft speed is preferably determined using at least fifteen (15) to twenty (20) of such speed segments. Here, the standard deviation of the speed segments can be determined as well, and if the speed standard deviation at any point is beyond a certain predetermined threshold (indicating an unsteady condition), new crankshaft speed data should be collected. This predetermined threshold will vary for different sizes and types of internal combustion engines 12.

The fourth step in the software program determines the average crankshaft speed fluctuation at each measured crankshaft position <38>. This is accomplished by summing the deviations at each crankshaft position from program step <36> and taking the average thereof for each crankshaft position.

At this point in the program, the kinetic energy variations of the rotatable crankshaft 18 due to each firing event and each compression event for each cylinder 14 are then computed by the electronic control module 24 <40>. This computation involves computing the variation in kinetic energy for each firing (combustion) event as well as each compression event. In other words, there are two points (or numbers) per cylinder. This program step involves integrating the average crankshaft speed fluctuation determined in program step <38> with respect to a predetermined angle for the rotatable crankshaft 18 from $\theta_{i1}$ to $\theta_{i2}$. By integrating the speed of the rotatable crankshaft 18, the amount of speed information for further processing per cycle of the internal combustion engine 12 is reduced from nN to 2N, where n is the number of teeth passing the engine speed sensor 26 per firing of the cylinder 14.

The instantaneous kinetic energy of the rotating parts of the internal combustion engine 12 is given by:

$$E_k = \frac{1}{2} I_e \dot{\theta}^2$$

where $I_e$ is the average inertia of all rotating parts of the internal combustion engine 12, and $\dot{\Theta}$ is the instantaneous angular velocity of of the crankshaft 18.

The variation of the shaft kinetic energy due to combustion disturbances is given by differentiating $E_k$, or $$\delta E_k = I_e \delta \dot{\theta} \dot{\theta} = I_e \delta \dot{\theta} \frac{d\theta}{dt}$$

where $\delta \dot{\Theta}$ is the small angular velocity fluctuation of the crankshaft 18 about its mean cycle value.

The total amount of kinetic energy that the rotatable crankshaft 18 and other rotating parts have gained or lost during the time period $\Delta t$ is therefore given by integrating $\delta E_k$ with respect to time; i.e., total energy gained (or lost)=

$$\int_{ti}^{tf} \delta Ek\, dt = I_e \int_{\Theta i1}^{\Theta i2} \delta \dot\Theta\, d\Theta$$

where $\Delta t = t_f - t_i$ and can preferably, but not necessarily, be the interval during which the crankshaft 18 has rotated sixty degrees (60°). The kinetic energy variation is preferably computed for only the period between twenty degrees (20°) $\Theta_{11}$ before top dead center and forty degrees (40°) $\Theta_{12}$ after top dead center and forty degrees (40°) $\Theta_{21}$ after top dead center and one hundred degrees (100°) $\Theta_{22}$ after top dead center, which reduces the speed data from seventy-two (72) to twelve (12) data points for one cycle of the internal combustion engine 12.

The next program step is to determine the normalized kinetic energy variations for a designated cylinder 14 or cylinders <42>. This is accomplished by dividing the kinetic energy level data by at least one predetermined constant, which can include, but is not limited to, a maximum absolute level of kinetic energy variation. Optionally, to obtain greater accuracy, the normalized kinetic energy changes may be subtracted from a normalized kinetic energy value for a normal internal combustion engine 12, that is, an internal combustion engine 12 without a power loss, operating under the same conditions.

The final program step determines information that represents the torque magnitude of the internal combustion engine 12 as a function of the normalized kinetic energy variations and the average crankshaft speed <44>. The representative torque of the internal combustion engine 12 is generated using a neural network or other suitable pattern-matching or function approximation algorithm.

According to a preferred embodiment, the power loss is determined using a neural network model based preferably, on radial basis function approximators, the output of which is a real-valued number representing the estimated engine torque at a designated test point. Each radial basis (RB) network has three layers: the input layer, the hidden layer, and the output layer. In turn, each layer has several processing units, called cells, which are joined by connections. Each connection has a numerical weight, $W_{ij}$, that specifies the influence of cell $C_i$ on cell $C_j$, and determines the behavior of the network. Each cell $C_i$ computes a numerical output that equates to the torque magnitude for the internal combustion engine 12 for the cylinder 14.

Since the illustrative, but nonlimiting, internal combustion engine 12 has six cylinders, and torque magnitude is determined as a function of kinetic energy variation due to combustion and compression effects and average crankshaft speed, the RB network for engine torque will have thirteen inputs, including: inputs one (1) through twelve (12) corresponding to the normalized kinetic energy variations for each of the cylinders 14 with two inputs for each cylinder 14 as defined in program step <38> above. Input thirteen (13) is defined as the average crankshaft speed. The cells in the input layer normalize the input signals received (preferably, between −1 and+1) and pass the normalized inputs to Gaussian processing cells in the hidden layer. This will make the inputs uniform regardless of the dimensions and units thereof. A linear mapping function is used to normalize each of the thirteen (13) inputs to the network according to its maximum and minimum variation levels, such that $$C_i = A_i + b_i I_i\ (i=1, 2, \ldots 13)$$

Where $I_i$ is the ith real valued input, $-1 \leq C_i \leq +1$ is the normalized output of the ith input cell, and the coefficients $A_i$ and $b_i$ are tabulated values maintained in memory.

The hidden layer is determined from real value training examples ($E^i$) for p number of input cells, here p equaling 13. Using a real valued function, for each training example $E^i$, an intermediate cell output $C_{p+i}$ can be generated when presented with an input vector E as follows:

$$C_{p+i} = f(\|E - E^i\|)$$

In this case, the normalized quantity $\|E-E^i\|$ is the Euclidean distance between the input vector E and the training vector $E^i$. For the function, a Gaussian distribution function such as the function $$f(E - E^i) = \exp\left[-\left(\frac{\|E - E^i\|}{\sigma_i}\right)^2\right]$$

$$f(E - E^i) = \exp\left[-\left(\frac{\|E - E^i\|}{\sigma_i}\right)^2\right]$$

is used where $\sigma_i$ is the width of the ith hidden cell. Preferably, the hidden cell activations $C_{p+i}$ from the input training data sets are computed using a default value of $\sigma_i = 0.833$ for all hidden cells.

For the output layer, the intermediate cells are used as a basis to represent real valued outputs, which is the predicted torque magnitude for the particular cylinder 14. Assuming that the torque magnitude is a linear function, the torque magnitude is a summary of the hidden cell outputs $C_{p+i}$ and the numerical weights such that:

$$\overset{\circ}{C} = \sum_{j=1}^{m} W_{p+j} C_{p+j}$$

where m is the number of cells in the hidden layer.

As an alternative method, using a fixed-point processor, a linear neural network approach can be used. In the linear neural network approach, the inputs and outputs are in binary −1 (or 0)+1 format, rather than the real-valued input and output data used in the radial basis neural network. With this approach, torque magnitude is determined to be the highest-valued output.

Industrial Applicability

The present invention is advantageously applicable in determining average crankshaft torque of an internal combustion engine having distinct firing (combustion) events and compression events, as a function of kinetic energy variation and average engine speed. Average crankshaft torque can be, but is not necessarily, determined over fifteen (15) to twenty-five (25) cycles. This method provides the significant advantage of producing torque measurements on-line from an engine solely by utilizing crankshaft speed measurements from production sensors. This present invention also provides the significant advantage of eliminating external measuring devices such as dynamometers. The representative crankshaft torque can be responsively produced and communicated to an onboard indicator light, stored and/or transmitted to a base station for subsequent action. This present invention can be utilized on virtually any type and size of internal combustion engine.

In view of the foregoing, it is readily apparent that the subject crankshaft torque method provides a determination of torque from crank speed fluctuations in a reciprocating internal combustion engine in a very simple and effective manner.

The following description is only for the purposes of illustration and is not intended to limit the present invention as such. It will be recognizable, by those skilled in the art, that the present invention is suitable for a plurality of other applications.

Other aspects, objects and advantages of the present invention can be obtained from a study of the drawings, the disclosure and the appended claims.

What is claimed is:

1. A method for detecting torque of a reciprocating internal combustion engine, said internal combustion engine having at least one cylinder and a rotatable crankshaft, comprising the steps of:

sensing rotational crankshaft speed for a plurality of designated crankshaft rotational positions over a predetermined number of cycles of rotation for each of said crankshaft positions;

determining an average crankshaft speed for said predetermined number of cycles, and an average crankshaft speed fluctuation for each said crankshaft position;

determining crankshaft kinetic energy variations using said average crankshaft speed fluctuations; and determining information representative of average crankshaft torque as a function of said crankshaft kinetic energy variations and said average crankshaft speed and responsively producing a representative crankshaft torque signal.

2. The method, as set forth in claim 1, further including a step of determining normalized kinetic energy variations, wherein information representative of crankshaft torque is determined as a function of said normalized kinetic energy variations and said average crankshaft speed.

3. The method, as set forth in claim 1, wherein said step of determining average crankshaft speed fluctuations includes subtracting said average crankshaft speed for a predetermined number of cycles of rotation of said rotatable crankshaft from an average said rotational crankshaft speed for each of said plurality of designated crankshaft rotational positions.

4. The method, as set forth in claim 1, wherein said designated plurality of crankshaft positions includes crankshaft positions within a predetermined range of said crankshaft positions before and after a top dead center position for said cylinder.

5. The method, as set forth in claim 1, wherein said step of responsively producing a representative crankshaft torque signal is performed using a neural network.

6. The method, as set forth in claim 1, wherein said step of responsively producing a representative crankshaft torque signal is performed using a radial basis neural network.

7. The method, as set forth in claim 1, wherein said step of responsively producing a representative crankshaft torque signal is performed using a pattern-matching algorithm.

8. The method, as set forth in claim 1, wherein said step of determining information representative of crankshaft kinetic energy variations includes integrating said average crankshaft speed fluctuation over a predetermined angle of rotation for said rotatable crankshaft.

9. The method, as set forth in claim 2, wherein said step of determining normalized kinetic energy variations for said cylinder includes dividing each said kinetic energy variation by a predetermined value.

10. The method, as set forth in claim 6, wherein said radial basis neural network includes two inputs for each of said cylinders and one input for said average crankshaft speed.

11. The method, as set forth in claim 6, wherein said radial basis neural network includes an input layer, a hidden layer, and an output layer.

12. The method, as set forth in claim 1, wherein said step of determining said torque of said rotatable crankshaft of said internal combustion engine is performed using a linear neural network with inputs in binary format.

13. A system for detecting torque of a reciprocating internal combustion engine, the internal combustion engine having at least one cylinder and a rotatable crankshaft, comprising:

an input mechanism that generates a signal, including a value for rotational crankshaft speed for a plurality of designated crankshaft rotational positions over a predetermined number of cycles of rotation for each of said crankshaft positions; and an electronic controller for determining an average crankshaft speed for said predetermined number of cycles, and an average crankshaft speed fluctuation for each said crankshaft position, determining crankshaft kinetic energy variations using said average crankshaft speed fluctuations determining, information representative of an average crankshaft torque as a function of said crankshaft kinetic energy variations and said average crankshaft speed and responsively producing a representative crankshaft torque signal.

14. The system, as set forth in claim 13, wherein said electronic controller determines normalized kinetic energy variations for said cylinder and information representative of crankshaft torque is determined as a function of said normalized kinetic energy variations and said average crankshaft speed.

15. The system, as set forth in claim 13, wherein said electronic controller determines average crankshaft speed fluctuations by subtracting said average crankshaft speed for a predetermined number of cycles of rotation of said rotatable crankshaft from an average said rotational crankshaft speed for each of said plurality of designated crankshaft rotational positions.

16. The system, as set forth in claim 13, wherein said electronic controller responsively produces a representative crankshaft torque signal with a neural network.

17. The system, as set forth in claim 13, wherein said electronic controller responsively produces a representative crankshaft torque signal with a radial basis neural network.

18. The system, as set forth in claim 13, wherein said electronic controller responsively produces a representative crankshaft torque signal with a pattern matching algorithm.

* * * * *